No. 726,749. PATENTED APR. 28, 1903.
A. W. POST.
WIRE FENCE TOOL.
APPLICATION FILED JAN. 23, 1903.
NO MODEL.
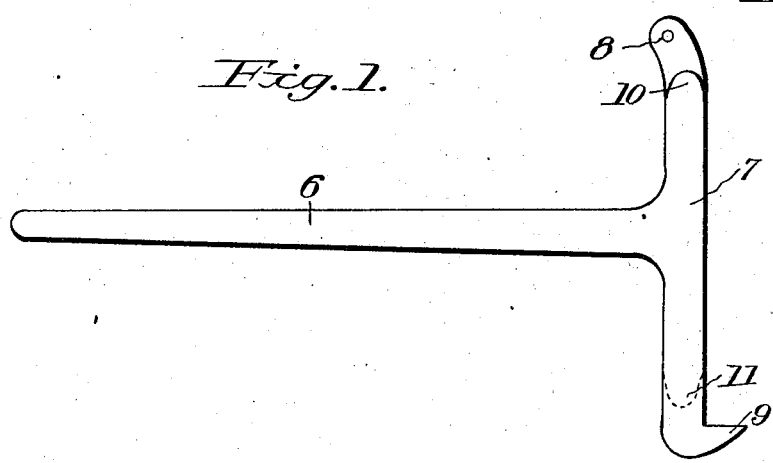
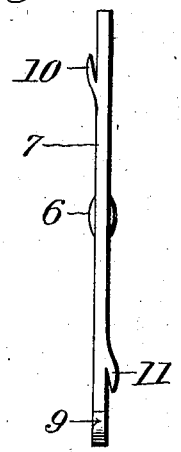
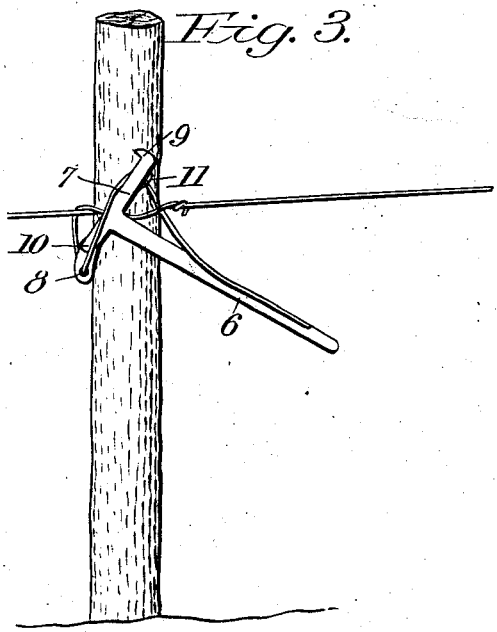
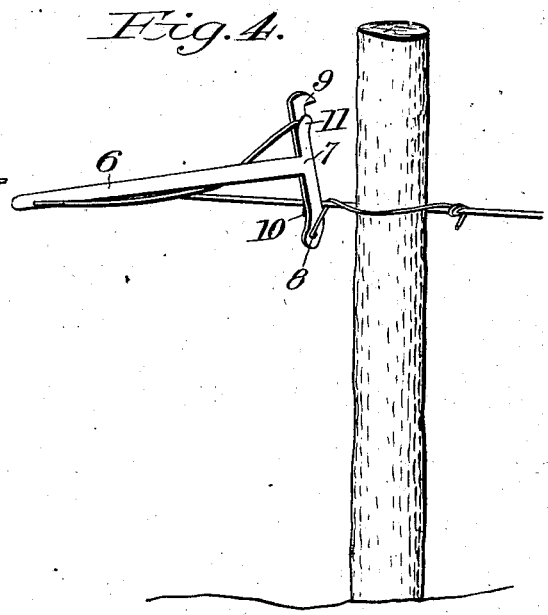

UNITED STATES PATENT OFFICE.

ALVA WILBER POST, OF HAVENSVILLE, KANSAS.

WIRE-FENCE TOOL.

SPECIFICATION forming part of Letters Patent No. 726,749, dated April 28, 1903.

Application filed January 23, 1903. Serial No. 140,244. (No model.)

*To all whom it may concern:*

Be it known that I, ALVA WILBER POST, a citizen of the United States, residing at Havensville, in the county of Pottawatomie and State of Kansas, have invented certain new and useful Improvements in Wire-Fence Tools; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention comprises a tool for bending and tying tie-wires around the post and line-wires of a wire fence; and the object of the invention is to form a tool with which such tie-wires may be rapidly applied without nailing or stapling.

In the accompanying drawings, Figure 1 is a plan view of the tool. Fig. 2 is an end view thereof. Figs. 3 and 4 are perspective views illustrating the manner of using the tool.

Referring specifically to the drawings, 6 indicates the handle of the tool joined at about the middle of a cross bar or head 7 and which bar has at one end an eye 8 and at the other end a tooth 9. On one side of the bar near the eye is a claw 10 and on the other side of the bar near the tooth is a claw 11.

In using the device to apply tie-wires to a fence the tie-wire is threaded through the eye and then brought up and caught under the claw 11 to hold it fast, which effect may be assisted by the operator grasping the wire along the handle. The free end of the wire is then fastened to the line-wire at one side of the post and brought around the post and over and under the line-wire on the other side of the post and drawn tight by sticking the tooth in the post and using the tool as a lever, as shown in Fig. 3. When sufficiently stretched and tightened, the tooth is released and the line-wire is caught under the claw 10, as shown in Fig. 4. This gives a purchase, enabling the tool to be turned over and under the line-wire, which has the effect of winding and twisting the tie-wire around the line-wire to make them fast, after which the tie-wire is cut adjacent the eye. The next length of wire may then be drawn through the eye for the next operation.

It will be seen that the tool is operative for both stretching or tightening and twisting or fastening the tie-wire and has advantages of simplicity and low cost and absence of loose parts.

What I claim as new, and desire to secure by Letters Patent, is—

A tool of the kind stated, comprising a handle joined to a cross-head having a tooth at one end and an eye at the other and wire-engaging claws adjacent the tooth and the eye.

In testimony whereof I affix my signature in presence of two witnesses.

ALVA WILBER POST.

Witnesses:
 GEO. F. HAIL,
 SAML. GRIMSHAW.